(12) United States Patent
Lalancette et al.

(10) Patent No.: US 8,344,248 B2
(45) Date of Patent: Jan. 1, 2013

(54) ELECTRICAL BOX

(75) Inventors: Daniel Lalancette, St-Jean-sur-Richelieu (CA); Marc-Antoine Veillette, Ange-Gardien (CA)

(73) Assignee: Thomas & Betts International, Inc., Wilmington, DE (US)

( * ) Notice: Subject to any disclaimer, the term of this patent is extended or adjusted under 35 U.S.C. 154(b) by 308 days.

(21) Appl. No.: 12/869,829

(22) Filed: Aug. 27, 2010

(65) Prior Publication Data

US 2011/0083871 A1 Apr. 14, 2011

Related U.S. Application Data

(60) Provisional application No. 61/250,085, filed on Oct. 9, 2009.

(51) Int. Cl.
*H05K 5/00* (2006.01)

(52) U.S. Cl. ............ 174/50; 174/58; 174/60; 439/535; 248/906

(58) Field of Classification Search ............ 174/50, 174/58, 60; 439/535; 248/906; 220/4.02
See application file for complete search history.

(56) References Cited

U.S. PATENT DOCUMENTS

| | | | |
|---|---|---|---|
| 982,193 A | 1/1911 | Thayer | |
| 1,869,646 A | 8/1932 | Anderson | |
| 2,954,419 A | 9/1960 | Bolef et al. | |
| 3,619,476 A | 11/1971 | Rasmussen | |
| 3,863,037 A | 1/1975 | Schindler et al. | |
| 3,896,960 A | 7/1975 | Schindler et al. | |
| 3,927,785 A | 12/1975 | Kinney et al. | |
| 3,980,197 A | 9/1976 | Ware | |
| 4,673,097 A | 6/1987 | Schuldt | |
| 4,688,693 A * | 8/1987 | Medlin, Jr. .............. | 220/3.9 |
| 4,757,158 A | 7/1988 | Lentz | |
| 5,287,665 A | 2/1994 | Rath, Jr. | |
| 5,834,692 A | 11/1998 | Lentz | |
| 6,031,181 A | 2/2000 | Jacks | |
| 6,437,241 B1 | 8/2002 | Neujahr | |
| 6,642,447 B1 | 11/2003 | Mailloux | |
| 6,660,936 B1 | 12/2003 | Jacks | |
| 7,186,916 B2 | 3/2007 | Jacks | |
| 7,214,876 B1 * | 5/2007 | Haberek et al. .......... | 174/58 |
| 7,476,805 B2 | 1/2009 | Jacks | |
| 7,816,604 B1 * | 10/2010 | Gretz ..................... | 174/58 |

* cited by examiner

*Primary Examiner* — Dhirubhai R Patel
(74) *Attorney, Agent, or Firm* — Snyder, Clark, Lesch & Chung, LLP

(57) ABSTRACT

An electrical box may include a top side and a bottom side that are connected to one another by panels. Each of the top side and bottom side may include a front portion with a side edge, a front edge and a back edge, a back portion with a side edge, a front edge and a back edge, and an angled portion connecting the front portion to the back portion, the back portion being offset with respect to the front portion. The angled portion may include a transition edge that joins the back edge of the front portion to the back edge of the back portion. The transition edge may provide for space for maneuvering the electrical box aligned to a wall stud in a wall assembly out of the wall assembly through a hole in a drywall of the wall assembly.

19 Claims, 16 Drawing Sheets

ELECTRICAL BOX

RELATED APPLICATION

This application claims priority under 35 U.S.C. §119 based on U.S. Provisional Patent Application No. 61/250,085 filed Oct. 9, 2009, the disclosure of which is incorporated by reference herein in its entirety.

BACKGROUND INFORMATION

Electrical outlet boxes are often mounted in walls before or after completion of the wall structure. For example, an electrical outlet box may be mounted on a wall stud before or after drywall installation.

DETAILED DESCRIPTION OF PREFERRED EMBODIMENTS

The following detailed description refers to the accompanying drawings. The same reference numbers in different drawings may identify the same or similar elements. As used herein, the term "vapor barrier" and "vapor membrane" may refer to material (e.g., polyethylene, etc.) that prevents penetration of moisture/vapor through a wall.

As described herein, an electrical box may be conveniently used in a wall assembly. The wall assembly may include insulation material that is overlaid with a vapor membrane and a drywall. Due to configuration of the electrical box, the electrical box may be installed, removed, or reinstalled in the wall assembly without damaging the vapor membrane. This may eliminate the time and effort required to seal a damaged vapor membrane.

Figure 1A:
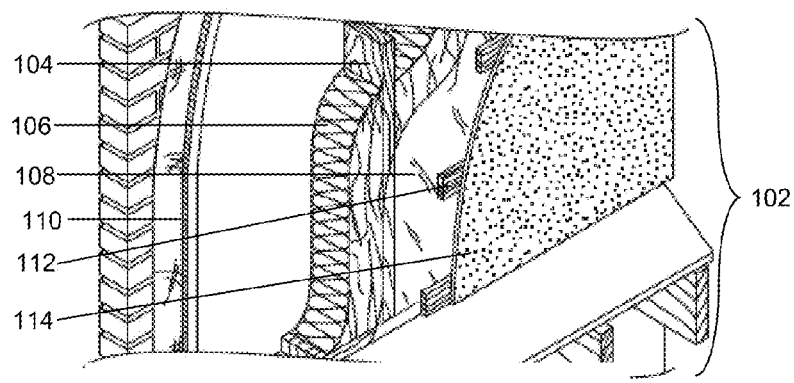
FIG. 1A illustrates an exemplary wall assembly in which an exemplary electrical box may be used.

FIG. 1A illustrates an exemplary wall assembly 102 in which an exemplary electrical box may be used. As shown, wall assembly 102 may include a wall stud 104, insulation material 106, a vapor barrier 108, a back wall 110, a furring 112, and a drywall 114. Depending on the implementation, wall assembly 102 may include fewer, additional, or different components than those illustrated in FIG. 1 (e.g., a metal stud).

Wall stud 104 may include one of vertical members of a frame to which a drywall is mounted. Insulation material 106 may include materials for decreasing heat transfer between one region that is partitioned from another region by insulation material 106. Vapor barrier 108 (e.g., plastic sheet) may prevent or retard movement of vapor/moisture from one side of vapor barrier to the other side. Examples of vapor barrier 108 may include an aluminum/paper sheet, plywood, polyethylene plastic sheet, etc. Back wall 110 may include a drywall or another type of building wall (e.g., a brick wall). Furring 112 may include horizontal beams or blocks that are attached to the frame to which the drywall is affixed. Drywall 114 may provide partitioning of space inside a house or building.

Figure 1B:
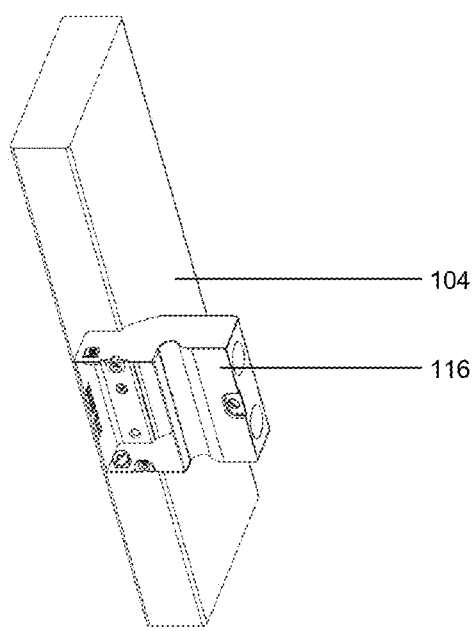
FIG. 1B illustrates an exemplary electrical box and a wall stud to which the electrical box of FIG. 1A may be mounted.

FIG. 1B illustrates an exemplary electrical box 116 and wall stud 104. Although electrical box 116 can be any box associated with electrical functions (e.g., a communication cable box, etc.), for the purpose of simplicity and ease in understanding, the electrical box 116 is described in terms of an electrical outlet box.

Electrical box 116 may provide an enclosure for electrical wiring. As shown, electrical box 116 may be mounted on wall stud 104. A step structure on the back of electrical box 116 may fit on an edge of wall stud 104 and align electrical box 116 to a particular orientation. The step structure may ensure that electrical box 116 does not turn or twist on wall stud 104 even when electrical box 116 is installed on wall stud 104 with a single screw. As shown, a front cover over part of electrical box 116 may protect components inside electrical box 116 from outside objects, items, or elements.

Figure 1C:
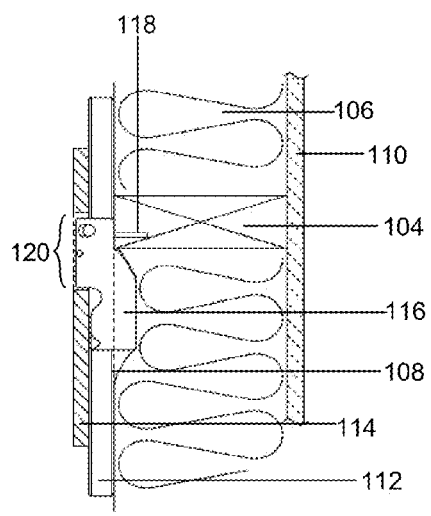
FIG. 1C is a top view of the electrical box installed on the wall assembly of FIG. 1A.

FIG. 1C is a top view of electrical box 116 installed on wall assembly 102. During the installation, electrical box 116 may be inserted into wall assembly 102 via a hole 120 in drywall 114. Electrical box 116 may be located adjacent to vapor barrier 108 and insulation material 106 without penetrating or puncturing vapor barrier 108. As shown, after the installation, a front portion of electrical box 116 may be inserted into hole 120, which exposes the face of electrical box 116 to the outside of wall assembly 102. Location of hole 120 relative to wall stud 104 may be such that the step structure on the back of electrical box 116 fits over wall stud 104.

Installing electrical box 116 can be more efficient than installing other types of electrical boxes. For example, to install a conventional electrical box in wall assembly 102, an electrician may cut vapor membrane 108, pass cables (e.g., electrical wires) through vapor membrane 108 to the electrical box, affix the cables and the electrical box on wall stud 104, and seal vapor membrane 108 with acoustical sealant and tape. Sealing vapor membrane 108 correctly can be difficult and time consuming, and in some instances, the electrician may avoid sealing vapor membrane 108 altogether. This, in turn, may cause vapor membrane 108 to be less effective in retarding moisture and cause the wall to become less energy efficient.

Figure 2A:
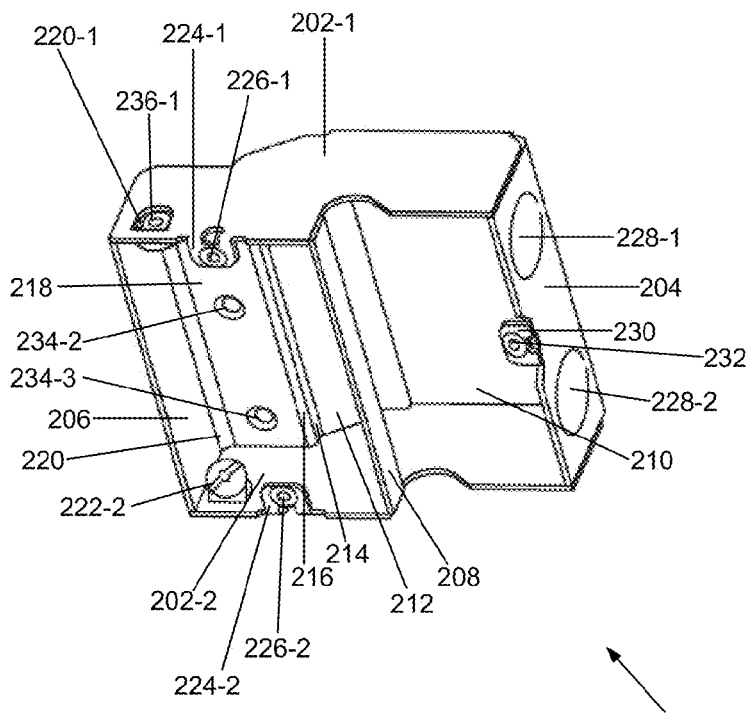
FIGS. 2A and 2B are top and bottom perspective views of the electrical box of FIG. 1B.
Figure 2B:
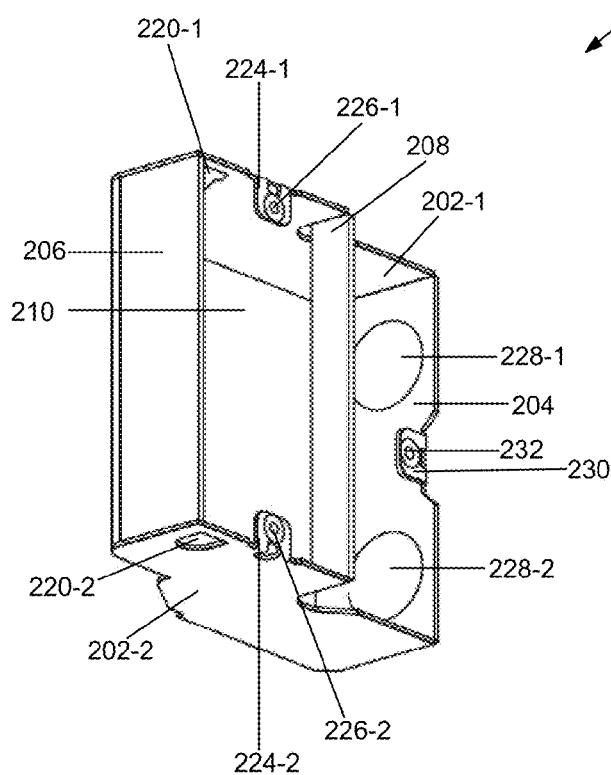

FIGS. 2A and 2B are top and bottom perspective views of electrical box 116. As shown in FIGS. 2A and 2B, electrical box 116 may include a top side 202-1, bottom side 202-2, back side 204, front side 206, partitioning strip 208, lower bottom panel 210, angled bottom panel 212, bottom step strip 214, wall step strip 216, mounting bottom panel 218, and edge panel 220. Although electrical box 116 may include a front cover, as illustrated in FIG. 1B, the front cover is not shown in FIGS. 2A and 2B.

Top side 202-1, bottom side 202-2, back side 204, and front side 206 may form electrical box 116's four sides adjoined at side edges that are substantially parallel to one another. Top side 202-1 may include two of the side edges, a front edge, some of which is exposed via hole 120 when electrical box 116 is installed in wall assembly 102, and a back edge to which bottom panels 210-220 are integrally attached. On the exposed portion of the front edge, top side 202-1 may include a cover fastening portion 224-1 that is formed perpendicularly to and integrally with top side 202-1. Cover fastening portion 224-1 may include a threaded hole 226-1. When electrical box 116 is installed in wall assembly 102, and a cover is placed over the exposed portion of electrical box 116, a screw may be inserted through a hole in the cover and into threaded hole 226-1. Tightening the screw may fasten the cover to electrical box 116.

In addition, top side 202-1 may include, below the exposed part of the front edge when electrical box is mounted in wall assembly 102 via hole 120, a grounding flap 220-1 that is formed by cutting a small area on the body of top side 202-1. Grounding flap 220-1 may include a threaded hole 236-1 into which a grounding screw (not shown) may be inserted. The grounding screw may be similar to a grounding screw 222-2 shown in FIG. 2B.

Bottom side 202-2 may include similar features as top side 202-1, and may provide similar functionality. For example, bottom side 202-2 may include a cover fastening portion 224-2 with a threaded hole 226-2 and a fastening flap 220-2 with a threaded hole 236-2 (not shown).

Back side 204 may include the two side edges to which top side 202-1 and bottom side 202-2 are attached, a front edge that is hidden behind drywall 114 when electrical box 116 is installed in wall assembly 102, and a back edge to which an angled bottom panel (not shown) is integrally attached. On the front edge, back side 204 may include a fastening portion 230 that is formed perpendicularly to and integrally with back side 204. Fastening portion 230 may include a threaded hole 232. A front cover may be attached to electrical box 116, as illustrated in FIG. 1B, by inserting a screw through a hole in the front cover and threaded hole 232. Tightening the screw may fasten the front cover to electrical box 116.

In addition, back side 204 may include knock-out holes 228-1 and 228-2 that may allow cables to enter electrical box 116. Although FIGS. 2A and 2B show two knock-out holes, depending on the implementation, back side 204 may include a different number and/or types of knock-out holes.

Front side 206 may include the two side edges to which top side 202-1 and bottom side 202-2 are attached, a front edge that is exposed via hole 120 when electrical box 116 is installed in wall assembly 102, and a back edge to which edge panel 220 is integrally attached.

Partitioning strip 208 may extend from a portion of the front edge of top side 202-1 to a corresponding portion of the front edge of bottom side 202-2. The front edge of partitioning strip 208, the front edge of front side 206, and the exposed portions of the front edges of top side 202-1 and bottom side 202-2 may enclose a cavity that is accessible via hole 120 when electrical box 116 is installed in wall assembly 102. A face plate may be attached to electrical box 116 via fastening portions 224-1 and 224-2 and cover the cavity.

Bottom panels 210-220 may be integrally attached to the back edges of top, bottom, back, and front sides 202-1, 202-2, 204, and 206, respectively. More specifically, each of bottom panels 210-220 may extend from top side 202-1 to bottom side 202-2. Furthermore, lower bottom panel 210 may be connected to back side 204's back edge and be connected to angled bottom panel 212, which is connected to bottom step strip 214. Bottom step strip 214 may be connected to wall step strip 216, which then may be connected to mounting bottom panel 218. Mounting bottom panel 218 may be attached to edge panel 220.

Mounting bottom panel 218 may include mounting holes 234-1 (not shown), 234-2, and 234-3. When electrical box 116 is placed in wall assembly 102 and aligned flush against wall stud 104 via wall step strip 216 and mounting bottom panel 218, electrical box 116 may be attached to wall stud 104 by inserting screws through one or more of mounting holes 234-1, 234-2, and 234-3 into wall stud 104 and fastening mounting panel 218 against wall stud 104. In one configuration, a single screw may be inserted through mounting hole 234-2 into wall stud 104 to fasten mounting panel 218.

Depending on the implementation, electrical box 116 may include additional, fewer, or different features than those illustrated in FIGS. 2A and 2B. For example, in place of angled bottom panel 112, electrical box 116 may include additional panels to provide a smoother surface. In addition, depending on the implementation, the dimensions of electrical box 116 may vary. In one exemplary implementation, electrical box 116 may be approximately $3\frac{5}{8}$ in $\times 4$ in $\times 1\frac{7}{8}$ in.

Figure 3:
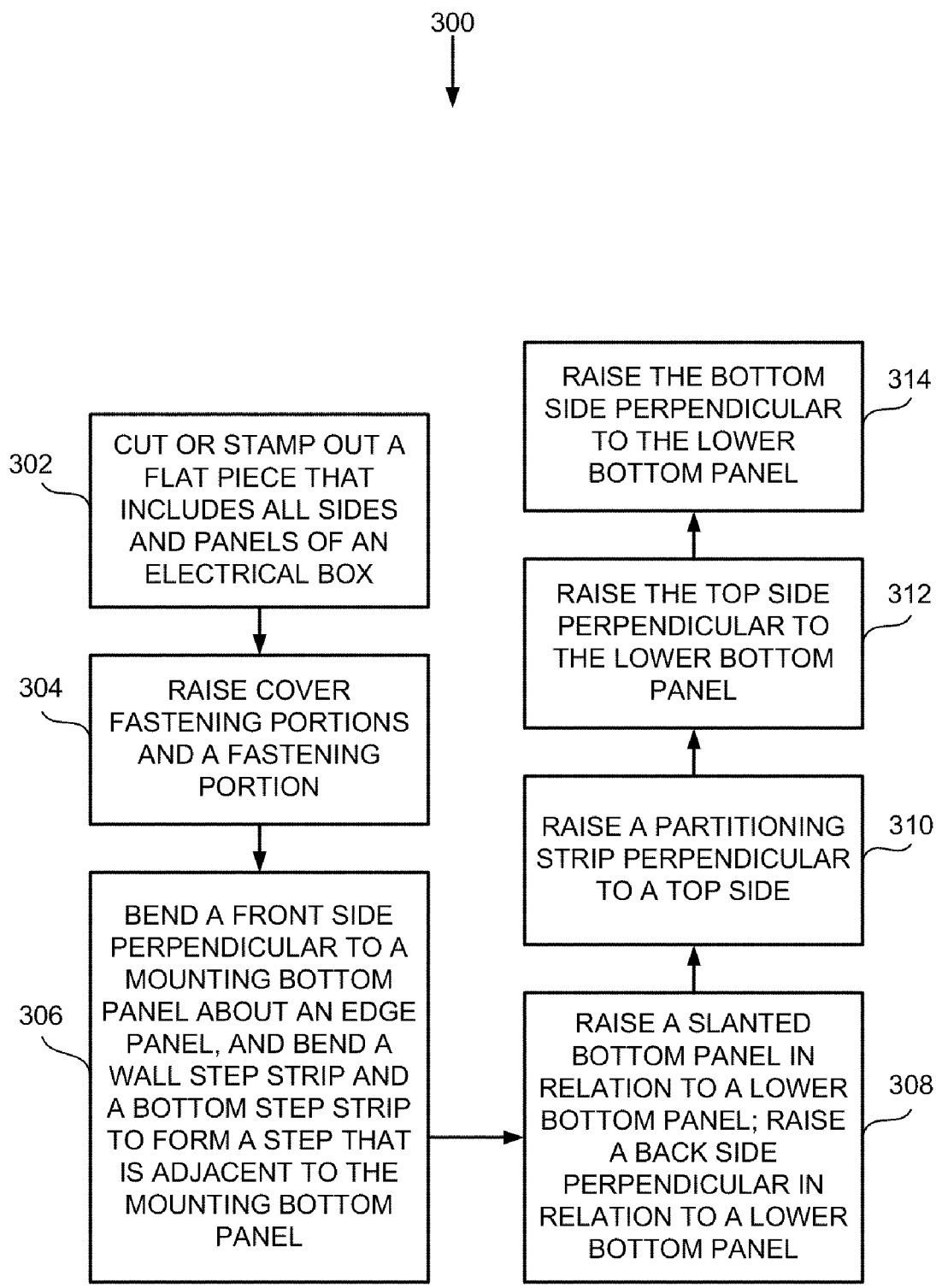
FIG. 3 is a flow diagram of an exemplary process that is associated with constructing the electrical box of FIG. 1B.

FIG. 3 is a flow diagram of an exemplary process 300 that is associated with constructing electrical box 116. Although electrical box 116 may be constructed in many ways, process 300 illustrates constructing electrical box 116 from a single, flat piece of material (e.g., a sheet metal, plastic, etc.).

FIGS. 4A through 4G and 5A through 5F illustrate process 300. More specifically, FIGS. 4A through 4G provide top and side views of the flat piece of material during the construction of electrical box 114, and FIGS. 5A through 5F provide perspective views of the flat piece throughout the construction.

Figure 4A:
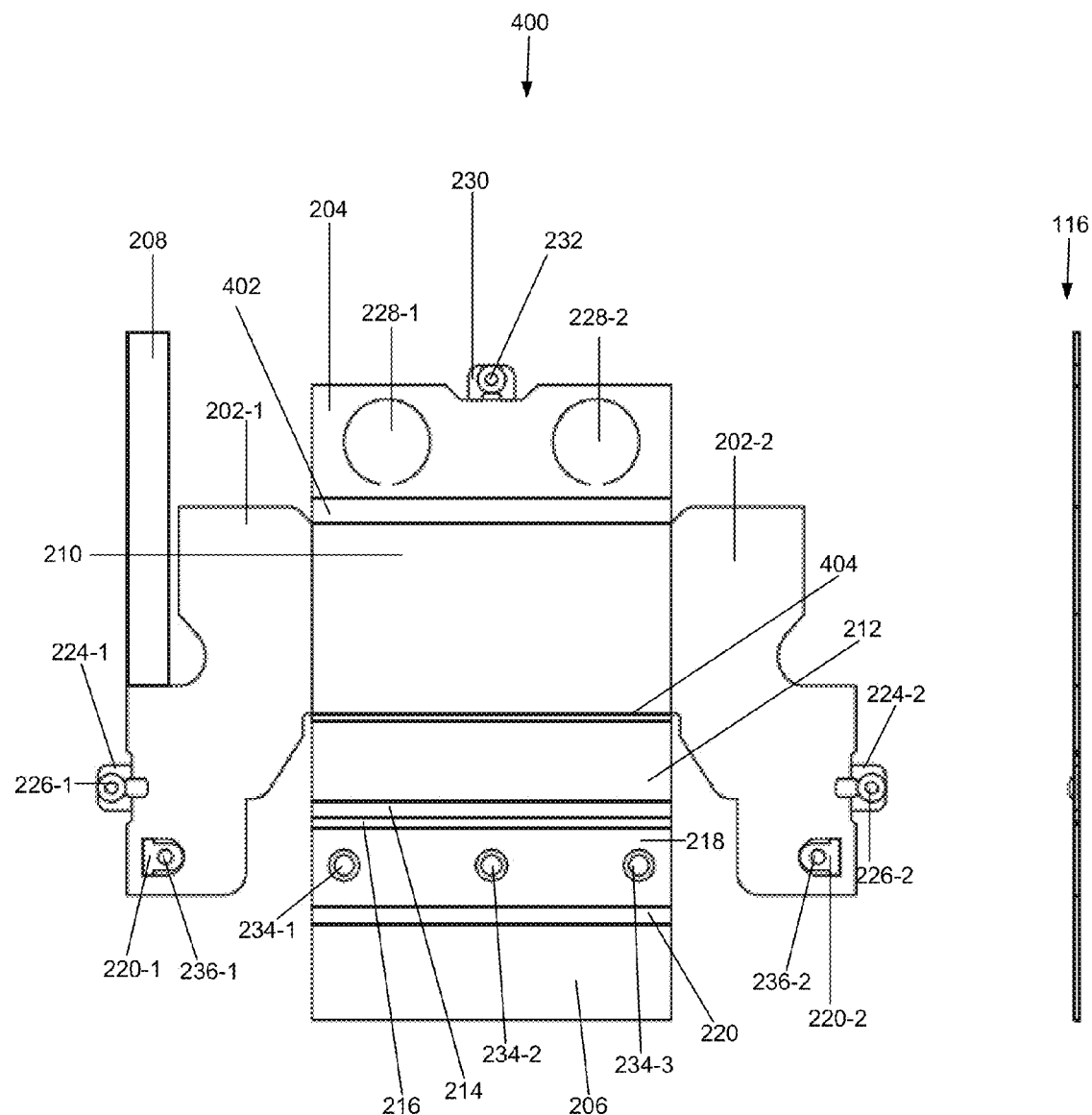
FIGS. 4A through 4G and 5A through 5F illustrate the exemplary process of FIG. 3.
Figure 5A:
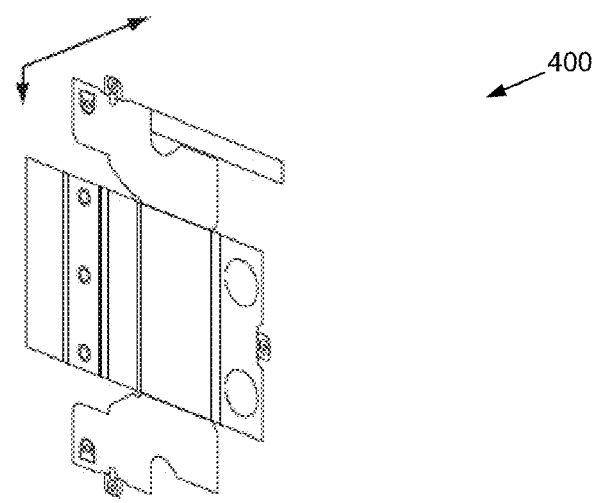

Process 300 may start with cutting or stamping out a flat piece that includes all sides and panels of electrical box 116 (block 302) (FIG. 4A). FIGS. 4A and 5A illustrate the flat piece 400. FIG. 4A shows labeled components, of flat piece 400, that correspond to components illustrated in FIGS. 2A and 2B. In addition, FIG. 4A shows strips 402 and 404 that are not shown in FIGS. 2A and 2B. Strips 402 and 404 form part of the bottom panels/strips of electrical box 116. FIG. 5A also shows flat piece 400, but does not show any labels that are shown in FIG. 4A for the purpose of simplicity and ease of understanding.

Figure 4B:
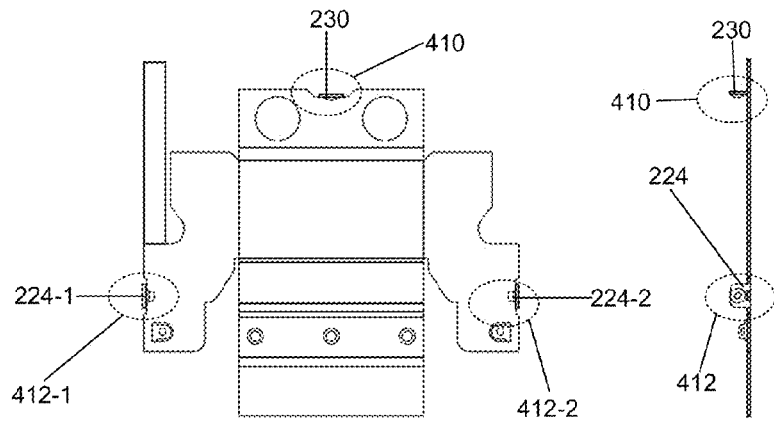
Figure 5B:
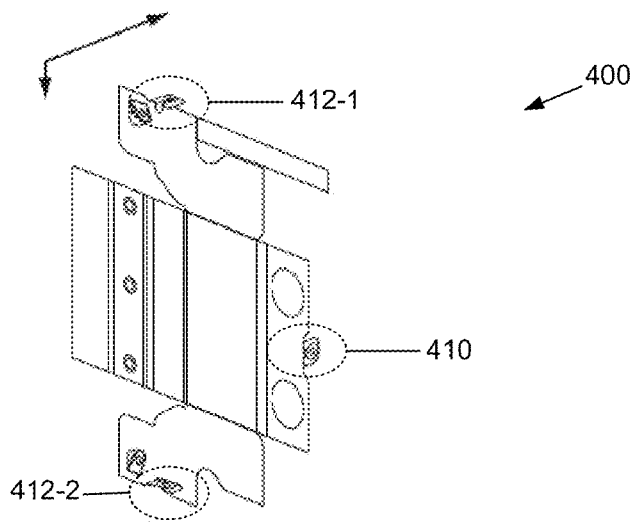

Cover fastening portions 224-1 and 224-2 and fastening portion 230 may be raised in a direction normal to the surface of flat piece 400 (block 304). FIGS. 4B and 5B show, in dotted ellipses 410, 412-1 and 412-2, the result of raising fastening portion 230 and cover fastening portions 224-1 and 224-2.

Figure 4C:
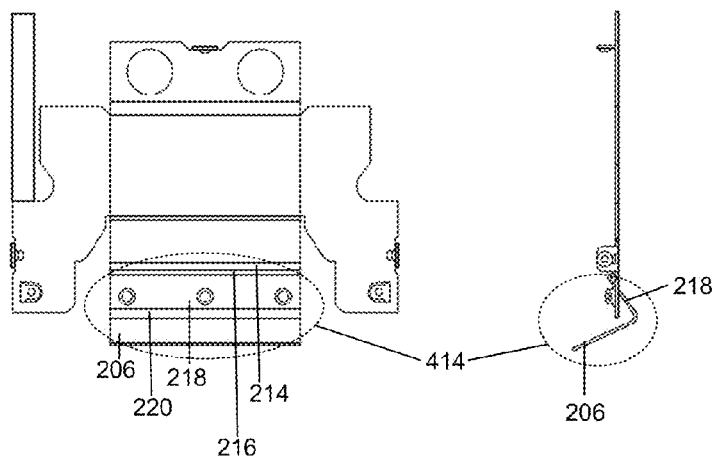
Figure 5C:
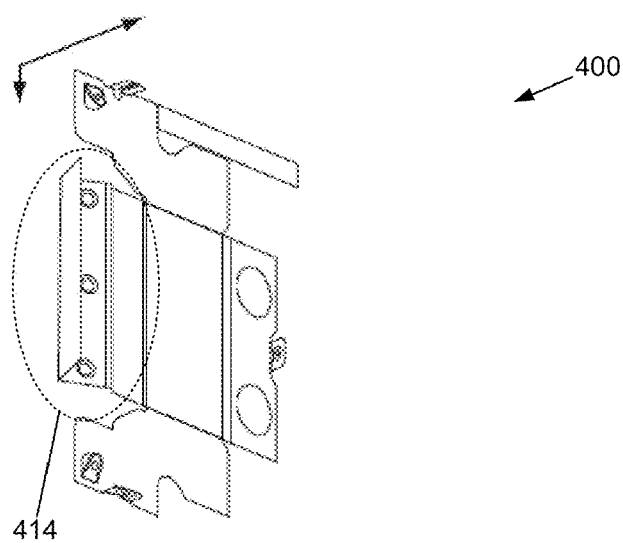

Front side 206 may be bent perpendicular to mounting bottom panel 218 about edge panel 220, and wall step strip 216 and bottom step strip 214 may be bent relative to one another to form a step that is adjacent to mounting bottom panel 218 (block 306). Ellipse 414 in FIGS. 4C and 5C illustrates front side 206, mounting bottom panel 218, edge panel 220, wall step strip 214, and bottom step strip 216 that are bent as described above.

Figure 4D:
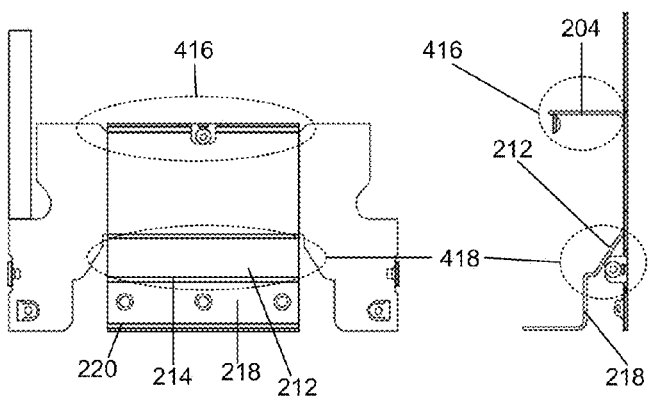
Figure 5D:
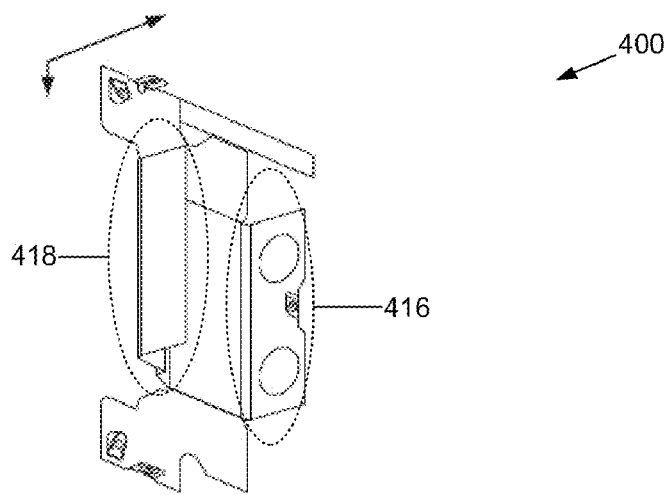

Angled bottom panel 212 may be raised in relation to lower bottom panel 210 about strip 404 (block 308). In addition, back side 204 may be raised perpendicularly in relation to lower bottom panel 210 about strip 402 (block 308). FIGS. 4D and 5D show raised back side 204 in ellipse 416 and angled bottom panel 212 in ellipse 418.

Figure 4E:
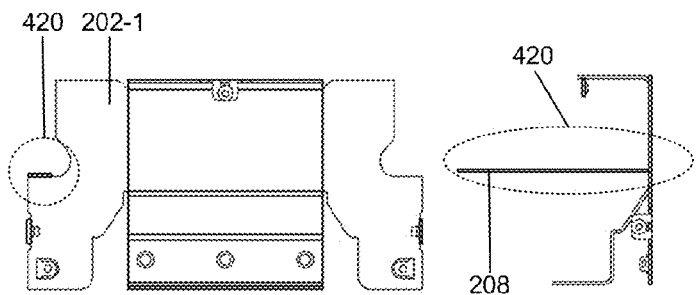
Figure 5E:
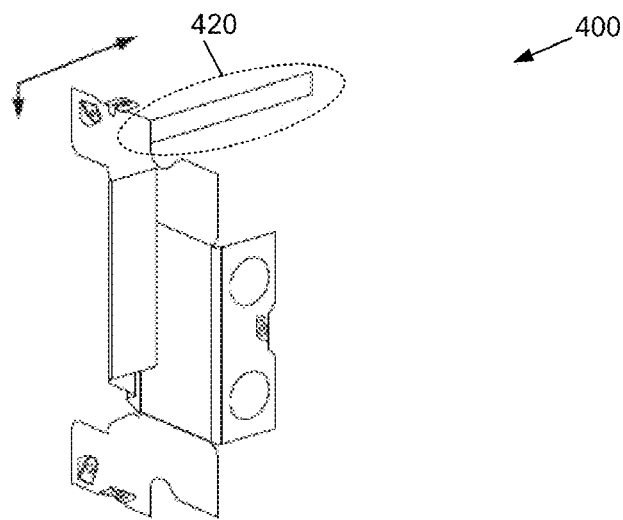

Partitioning strip 208 may be raised perpendicular to top side 202-1 (block 310). FIGS. 4E and 5E show a result of raising partitioning strip 208 in ellipse 420.

Figure 4F:
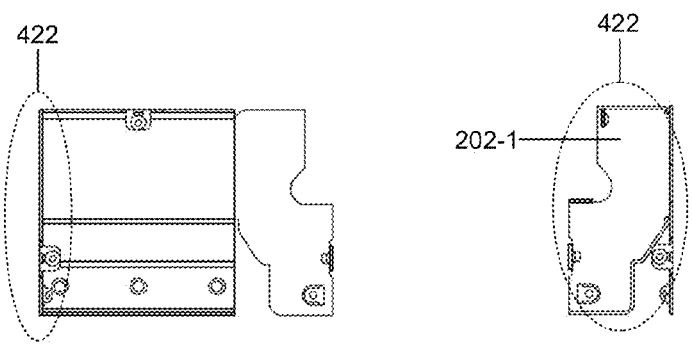
Figure 5F:
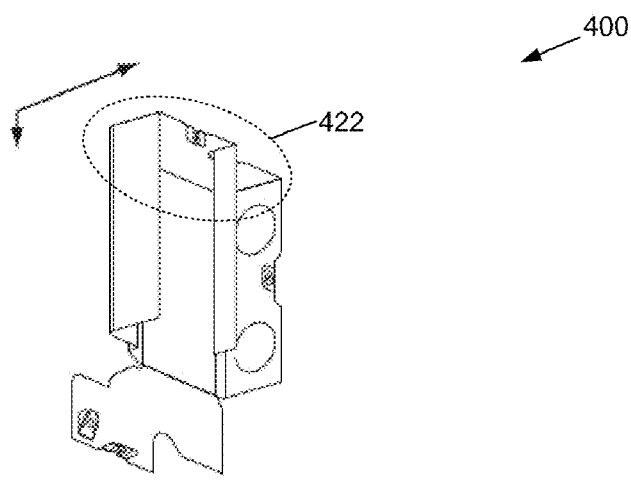

Top side 202-1 may be raised perpendicular to lower bottom panel 210 (block 312). FIGS. 4F and 5F show raising top side 202-1 perpendicular to lower bottom panel 210 in ellipse 422.

Figure 4G:
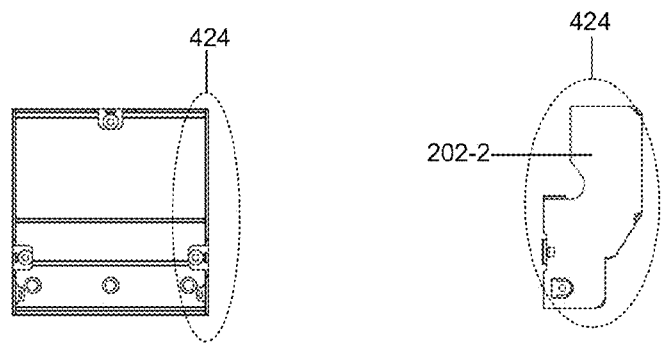

Bottom side 202-2 may be raised perpendicular to lower bottom panel 210 (block 314). FIG. 4G shows the result of raising bottom side 202-2. Raising the bottom side 202-2 completes the shaping of electrical box 116. Subsequently, welding the side junctions of electrical box 116 may complete its construction.

In some implementations, electrical box 116 may be fabricated with separate sides and assembled together with screws or by welding.

Figure 5G:
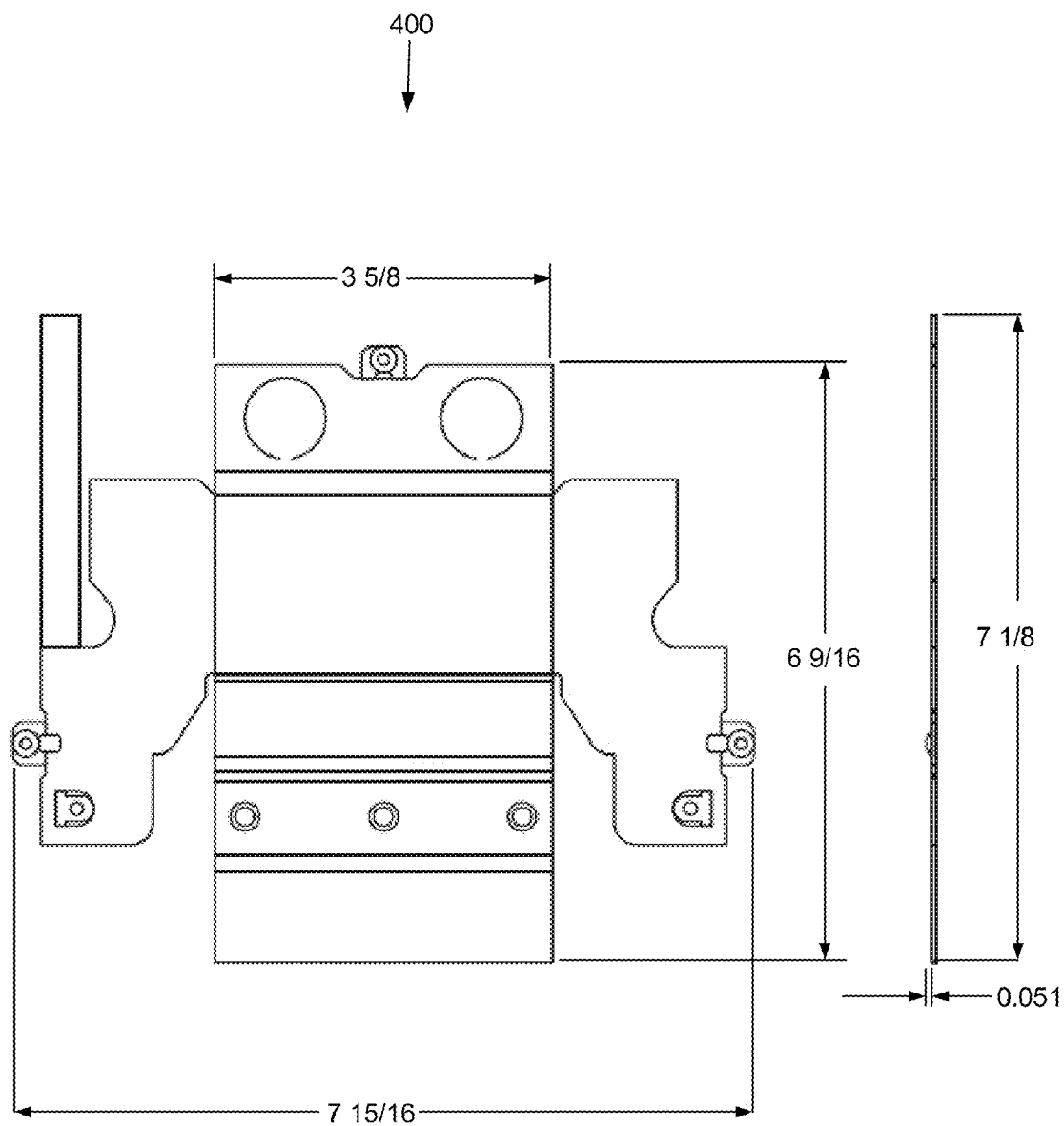
FIG. 5G shows a number of exemplary dimensions of a flat piece of FIG. 4A.

FIG. 5G shows a number of exemplary dimensions of flat piece 400. The dimensions may vary depending on the implementation. As shown, flat piece may be about 7⅛ in ×7¹⁵⁄₁₆ in ×0.051 in. Each of back side 204 and front side 206 may be 3⅝ in wide, which is approximately the width of electrical box 116. Further, in FIG. 5G, an area that extends from the front edge of front side 206 to the front edge of back side 204 may be approximately 6⁹⁄₁₆ in.

Figure 6A:
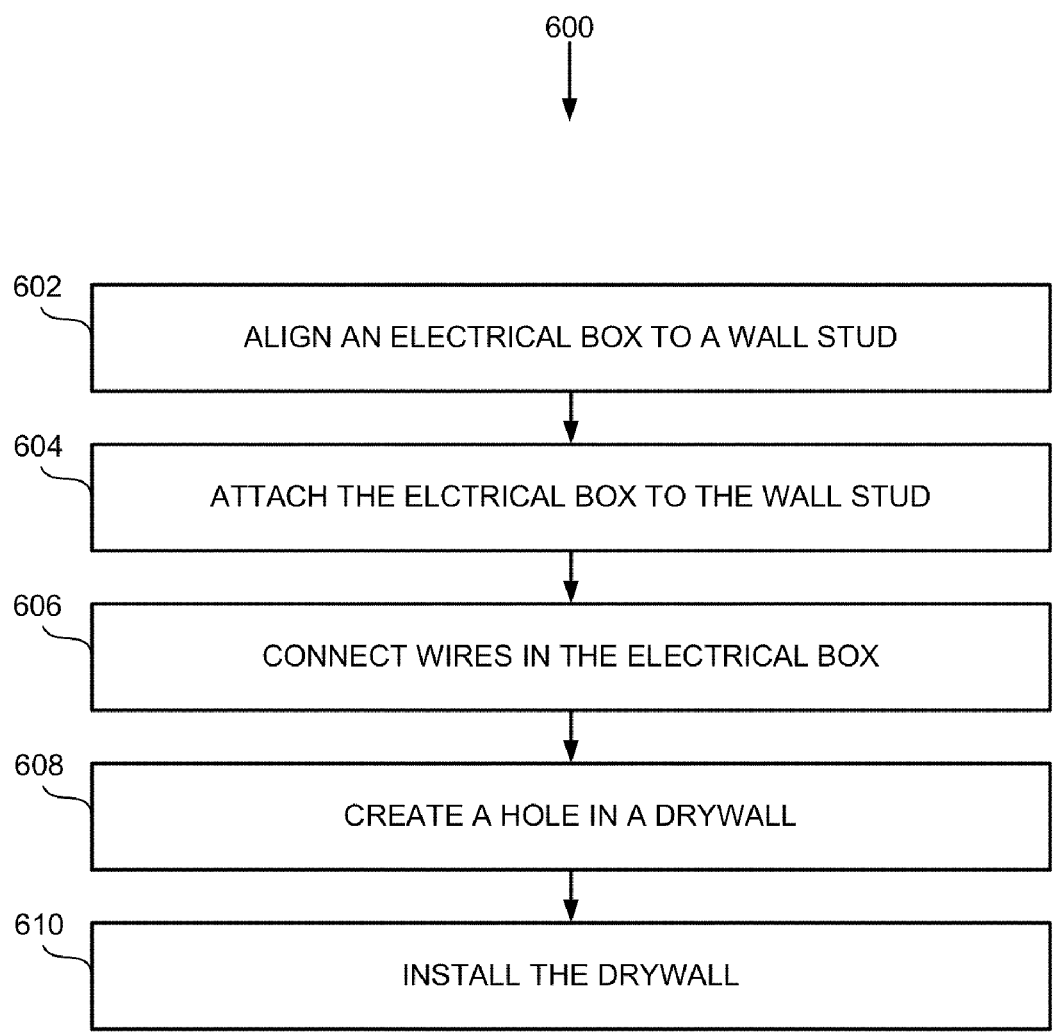
FIG. 6A is a flow diagram of an exemplary process for installing the electrical box of FIG. 1B in the wall assembly of FIG. 1A.

FIG. 6A is a flow diagram of an exemplary process 600 for installing electrical box 116 in wall assembly 102. Assume that drywall 114 of wall assembly 102 is not installed (e.g., not yet attached to furring 112). Process 600 may begin when electrical box 116 is aligned to wall stud 104. FIGS. 1B and 1C show the configuration of electrical box 116 that is aligned to wall stud 104.

Figure 8:
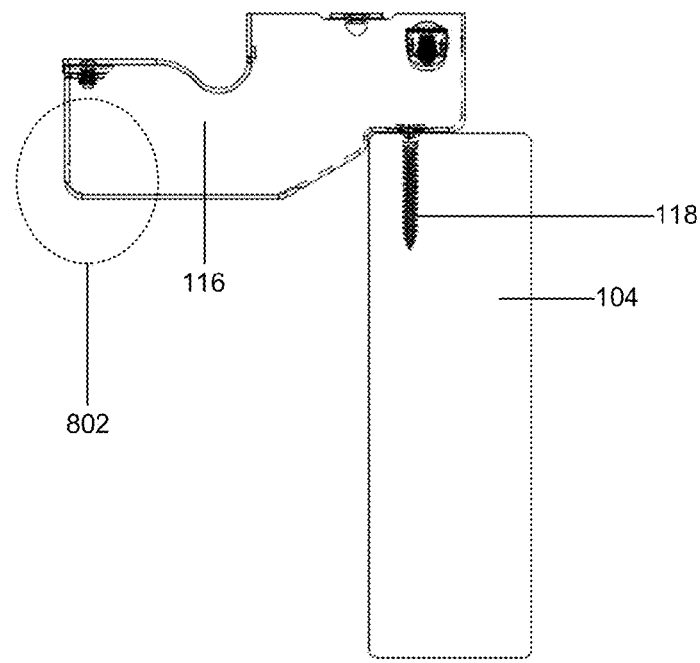
FIG. 8 is a cross-sectional top view of the electrical box that is mounted on the wall stud of FIG. 1B.

Electrical box 116 may be attached to wall stud 104 (block 604). To attach electrical box 116 to wall stud 104, a screw may be driven through each of one or more of mounting holes 234, into wall stud 104. FIGS. 1C and 8 show the resulting configuration of electrical box 116.

At block 606, wires in electrical 116 may be connected (block 606).

Hole 120 may be cut in drywall 114 (block 608). In creating hole 120, an installer may position hole 120 in drywall 114 so that a face of electrical box 116 is exposed to the outside of wall assembly 102 when drywall 114 is assembled as part of wall assembly 102.

Drywall 114 may be installed (block 610). FIG. 1C shows a top view of the resulting configuration.

Figure 6B:
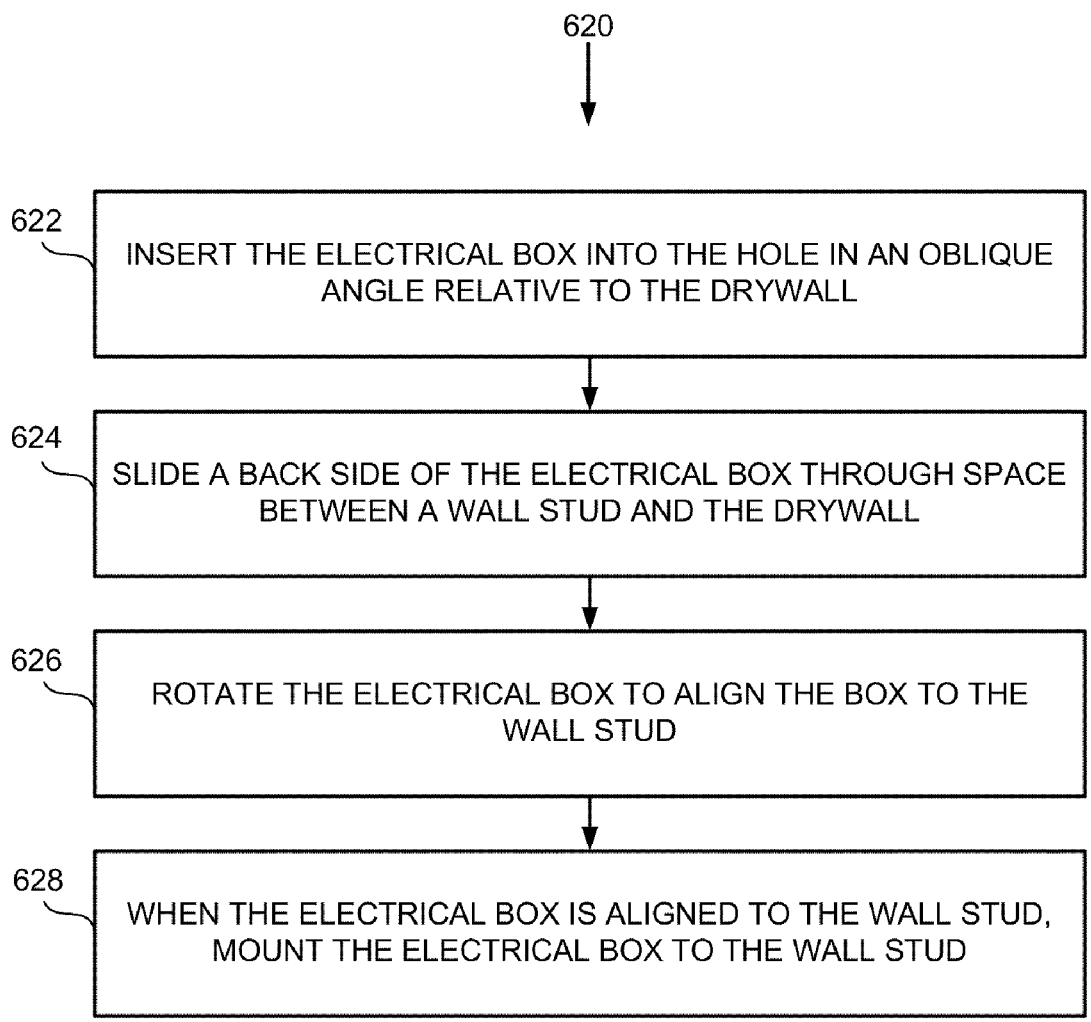
FIG. 6B is a flow diagram of an exemplary process for reinstalling the electrical box of FIG. 1B in the wall assembly of FIG. 1A.

FIG. 6B is a flow diagram of an exemplary process 620 for reinstalling electrical box 116 in wall assembly 102. Before reinstalling electrical box 116, however, it may be necessary to remove electrical box 116 from wall assembly 102. This may be accomplished by performing a reverse of process 620, which is described below. FIGS. 7A through 7E illustrate process 620. Assume that electrical wires are connected in electrical box 116.

Figure 7A:
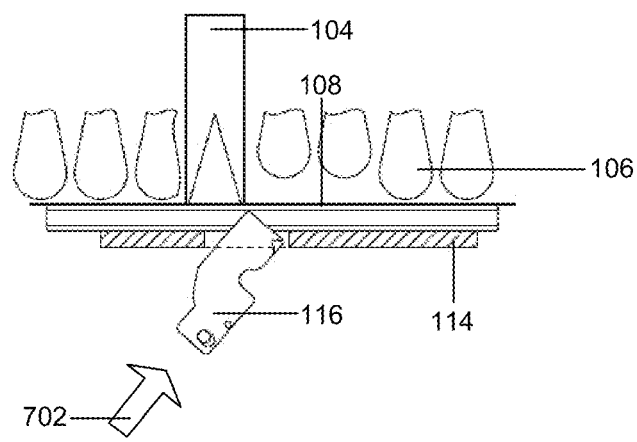
FIGS. 7A through 7E illustrate the exemplary process of FIG. 6.

Process 620 may start with inserting electrical box 116 into hole 120 in an oblique angle relative to drywall 114 (block 622). FIG. 7A is a top view that illustrates inserting electrical box 116. As shown, electrical box 116 may be inserted in the direction indicated by arrow 702. In inserting electrical box 116 into hole 120, top side 202-1 of electrical box 116 may be oriented such that the longitudinal axis of wall stud 104 is parallel to a vector normal to top side 202-1. In addition, the bottom panels of electrical box 116 may face toward drywall 114.

A step on the back of electrical box 116 may fit on an edge of wall stud 104 and align electrical box 116 in a fixed orientation. The step on the back of electrical box 116 may ensure that electrical box 116 does not turn or twist on wall stud 104 even when electrical box 116 is attached on wall stud 104 with a single screw.

Figure 7B:
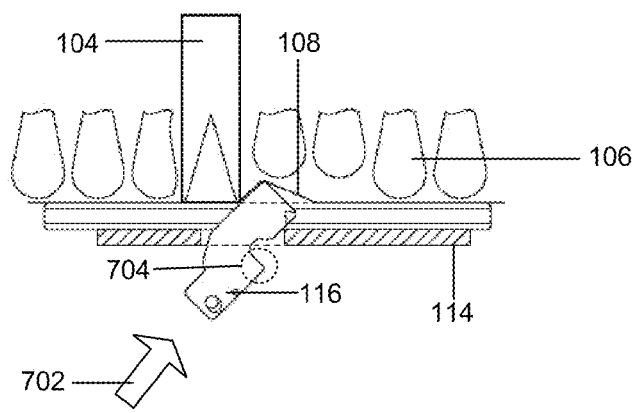
Figure 7C:
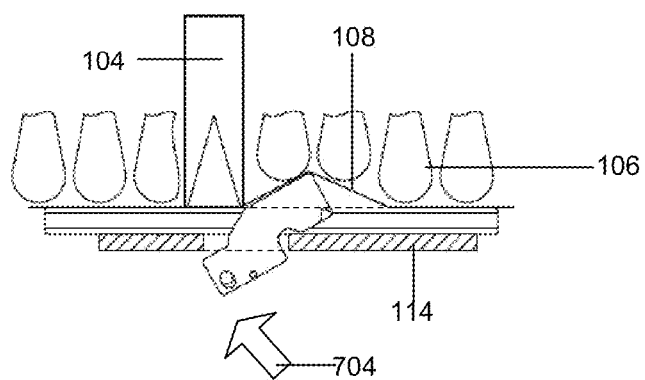
Figure 7D:
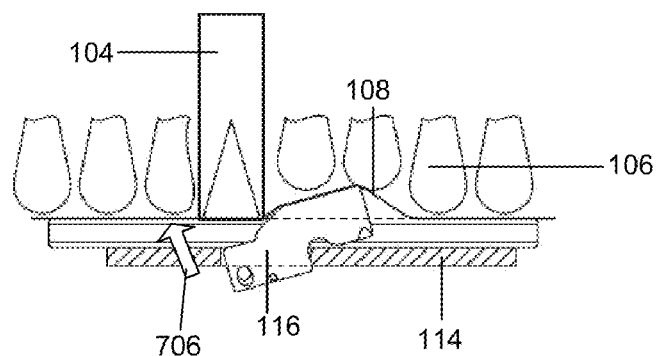

Electrical box 116 may be pushed into hole 120 such that back side 206 of electrical box 116 slides through space between wall stud 104 and drywall 114 (block 624), as illustrated in FIG. 7B. As shown, back side 206 of electrical box 116 may push against vapor barrier 108 and/or insulation material 106. Electrical box 116 may be pushed until an area 704 of electrical box 116, shown in a dotted ellipse, abuts drywall 114, as illustrated in FIG. 7C.

Figure 7E:
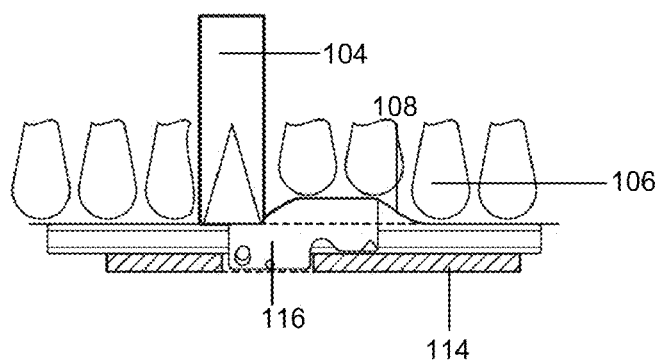

Electrical box 116 may be rotated about a drywall portion that is abutting area 704 to align electrical box 116 to wall stud 104 (block 626). As shown in FIG. 7C, electrical box 116 may be rotated about area 704 in the direction of arrow 706. As further shown in FIG. 7D, rotating electrical box 116 may move front side 206 of electrical box 116 closer to wall stud 104 in the direction of arrow 706. Electrical box 116 may be aligned to wall stud 104 when the step formed by the bottom panels at the back of electrical box abuts wall stud 104, as illustrated in FIG. 7E.

In inserting electrical box 116 into wall assembly 102 and aligning electrical box 116 to wall stud 104 (i.e., in performing acts that are associated with blocks 622-626 and illustrated in FIGS. 7A through 7E), the shape electrical box 116 along a plane perpendicular to the longitudinal axis of wall stud 104 may aid in maneuvering electrical box 116 onto the proper location.

Figure 7F:
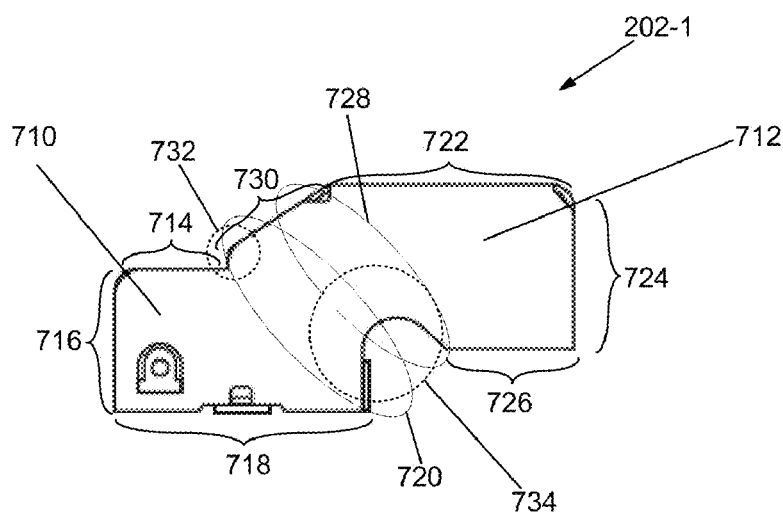
FIG. 7F shows an exemplary top side of the electrical box of FIG. 1B.

FIG. 7F shows top side 202-1 of electrical box 116. The shape of top side 202-1 may be the shape of electrical box 116 along a plane perpendicular to the longitudinal axis of wall stud 104. As shown, top side 202-1 may include front body 710, back body 712. Depending on the implementation, top side 202-1 may include additional and/or different portions.

Front body 710 may be generally rectangular, and may include a back edge 714, side edge 716, front edge 718, and connecting portion 720. Back body 712 may also be generally rectangular, and may include a back edge 722, side edge 724, front edge 726 and connecting portion 728.

Connecting portions 720 and 728 may integrally join front body 710 and back body 712, and may include an angled edge 730 and curved portion 734. Angled edge 730 may connect back edge 714 of front portion 710 to back edge 722 of back portion 712. During a reinstallation of electrical box 116 (e.g., during acts that are associated with blocks 622-628 and illustrated in FIGS. 7C-7E), angled edge 730 at the back of top side 202-1 may allow for clearance for maneuvering (e.g., rotating) electrical box 116 into a proper position for mounting electrical box 116 to wall stud 104, without being obstructed by a corner edge of wall stud 104. Angled edge 730 may include a step 732 that connects to low back edge 714 for aligning electrical box 116 to wall stud 104 during the reinstallation of electrical box 116. Depending on the implementation, in place of slanted edge 730, connecting portion may include another type of edge (e.g., rounded edge) that provides for the clearance.

Curved portion 734 may connect front edge 718 of front portion 710 to front edge 726 of back portion 712. During a reinstallation of electrical box 116 (e.g., during acts that are associated with blocks 622-628 and illustrated in FIGS. 7C-7E), curved portion 734 at the front of top side 202-1 may allow for clearance for maneuvering (e.g., rotating) electrical box 116 into a proper position for mounting electrical box 116 to wall stud 104, without being obstructed by an edge of drywall 114.

Figure 7G:
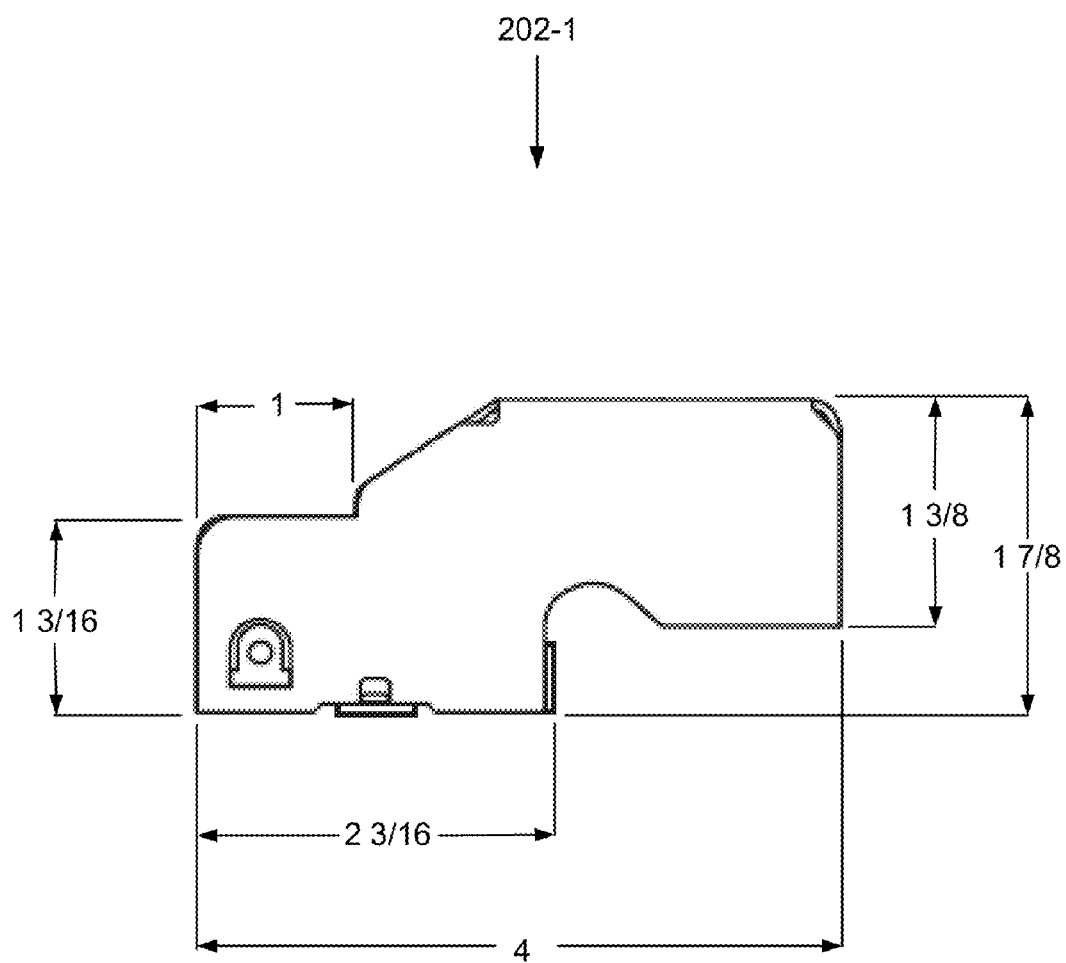
FIG. 7G shows a number of exemplary dimensions of the top side of the electrical box of FIG. 1B.

FIG. 7G shows a number of exemplary dimensions of top side 202-1. The dimensions may vary depending on the implementation. As shown, top side 202-1 may be approximately 4 in ×1⅞ in. Further, back edge 714, side edge 716, front edge 718, and side edge 724 may be about 1 in, 1³⁄₁₆ in, 2³⁄₁₆ in, and 1⅜ in, respectively (see FIG. 7F for edge labels). Lengths of side edge 716 and side edge 724 may be approximately equal to depths of electrical box 116 around front portion 710 and back portion 712, respectively, and as further shown, the combined lengths of front edge 716, front edge 726, and part of curved portion 734 may extend about 4 in, which may be approximately the length of electrical box 116.

Returning to FIG. 6B, when electrical box 116 is aligned to wall stud 104, electrical box 116 may be mounted on wall stud 104 (block 628). FIG. 8 is a cross-sectional top view of electrical box 116 mounted on wall stud 104. As shown, with electrical box 116 aligned to wall stud 104, a screw 118 is screwed into wall stud 104 via mounting hole 234-2. Depending on the implementation, the hole(s) provided for fastening of electrical box 116 to wall stud 104 may be positioned so that a screw or nail can be inserted perpendicular to the surface of wall stud 104.

As illustrated in FIGS. 2A and 2B, electrical box 116 may include knock-out holes 228-1 and 228-2. Knock-out holes may allow insertion of connectors, or conduit. In some implementations, electrical box 116 may include standard clamps for holding non-metallic sheathed electrical cables inserted into electrical box 116. Such clamps may be included in an area or portion within a dotted ellipse 802 (FIG. 8).

Figure 9:
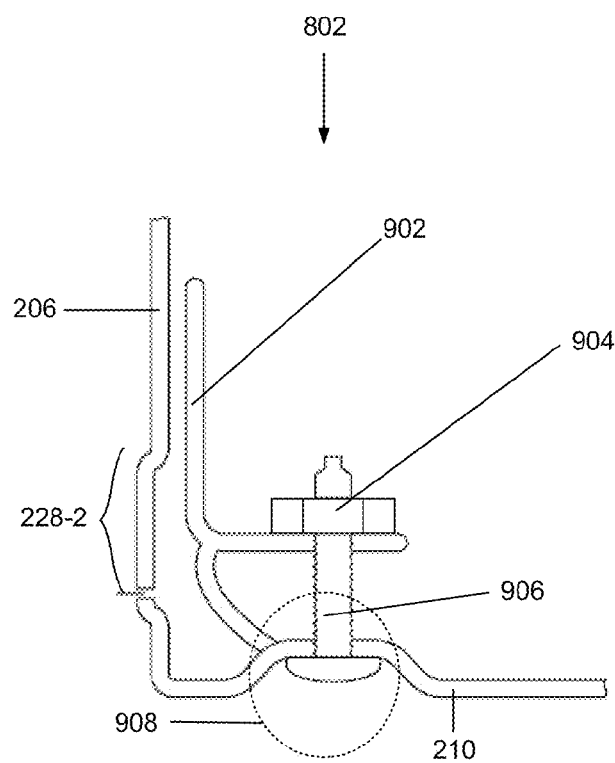
FIG. 9 is an exploded view of a portion of the electrical box of FIG. 8.

FIG. 9 is an exploded view of a portion 802 of electrical box 116. As shown, portion 802 of electrical box 116 may include a clamp 902, nut 904, and screw 906. Screw 906 may be placed in the shown configuration when screw 906 is inserted from the outside electrical box 116 through a hole (not shown) on electrical box 116 and a hole in clamp 902 and rotated into nut 904. Screw 906 may be tightened to increase the tension that clamp 902 applies to a cable (not shown) held by clamp 902. As indicated by a dotted ellipse 908, the portion of electrical box 116 surrounding the head of screw 906 is recessed to partially cover the head of the screw, so that the head does not touch vapor barrier 108 (see FIG. 1A and FIG. 1C) when electrical box 116 is installed in wall assembly 102.

After electrical box 116 is installed/reinstalled in wall assembly 102 in accordance with processes 600/620 in FIGS. 6A/6B, if desired, electrical box 116 may be removed from wall assembly 102 by performing reverses of the acts that are illustrated in blocks 622-628. In removing electrical box 116 from wall assembly 102, the shape of electrical box 116 (e.g., slanted edge 730, curved portion 734, etc.) may provide the proper clearance for maneuvering electrical box 116 out of wall assembly 102 through hole 120.

Figure 10:
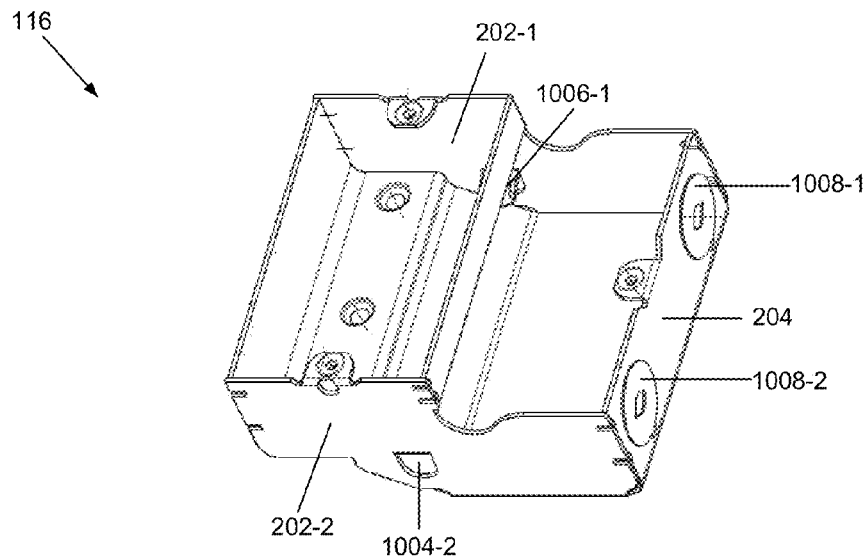
FIG. 10 is a top perspective view of the electrical box of FIG. 1B according to another implementation.

FIG. 10 is a top perspective view of 116 according to another implementation. As shown, in this implementation, bottom side 202-2 may include a hole 1004-2 formed by punching out a ground ear 1006-2 (not shown). Although ground ear 1006-2 is not shown, a corresponding ground ear 1006-1 for top side 202-1 is illustrated in FIG. 10. In contrast to groundling flap 220-1 (see FIGS. 2A and 2B), ground ear 1006-1 is located in the middle of top side 202-1, such that wires connecting to ground may be positioned differently than the wires in FIG. 2A. or FIG. 2B.

In addition, back side 204 may include two knockouts 1008-1 and 1008-2. Knockout 1008-1 may be removed from electrical box 116 by placing a metal insert or member of some sort into a diamond-like hole about the middle of knockout 1008-1 and prying out knockout 1008-1 from electrical box 116. Knockout 1008-2 may be similarly removed from electrical box 116.

Figure 11:
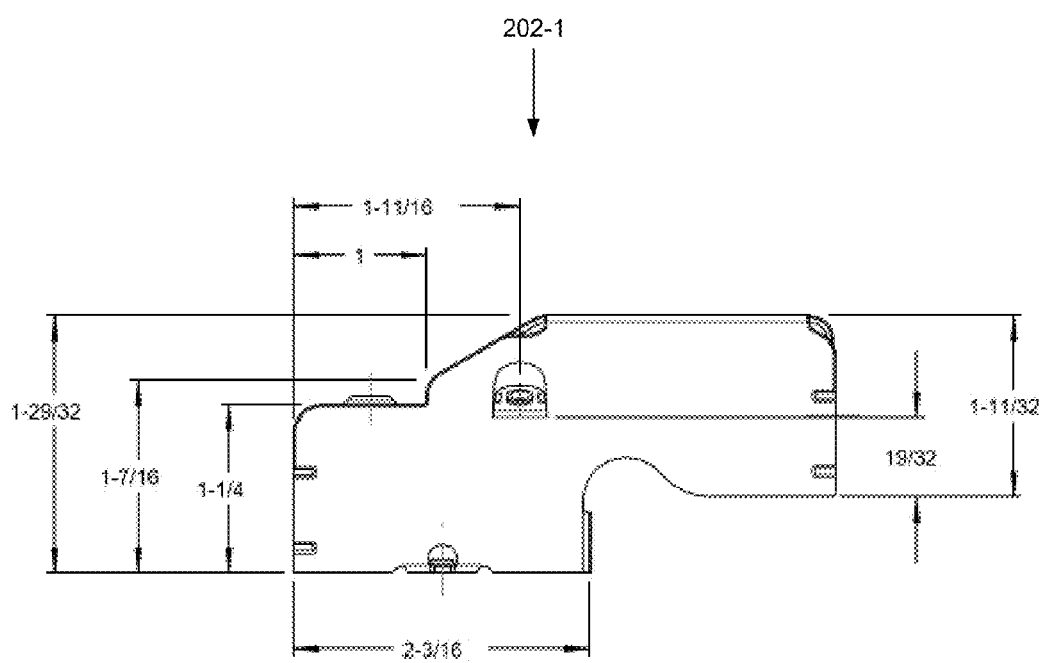
FIG. 11 shows a number of exemplary dimensions of the top side of the electrical box of FIG. 1B according to the implementation of FIG. 10.

FIG. 11 shows a number of exemplary dimensions of the top side of electrical box 116 according to the implementation consistent with FIG. 10. As in FIG. 7G, the dimensions may vary depending on the specifics of the implementation. As shown, top side 202-1 may be close to 4 in ×1²⁹⁄₃₂ in. Further, back edge 714, side edge 716, front edge 718, and side edge 724 may be approximately 1 in, 1¼ in, 2³⁄₁₆ in, and 1¹¹⁄₃₂ in, respectively (see FIG. 7F for edge labels).

As described above, electrical box 116 may be used conveniently in wall assembly 102. Wall assembly 102 may include insulation material 106 that is overlaid with vapor barrier 108 and drywall 114. Electrical box 116 may be installed, removed, and reinstalled in wall assembly 102 without damaging vapor barrier 108. This may eliminate the time and effort required to seal the membrane, and therefore, to install electrical box 116.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above mentioned description is to be considered exemplary, rather than limiting, and the true scope of the invention is that defined in the following claims.

In addition, while series of blocks have been described with regard to exemplary processes illustrated in FIGS. 3, 6A and 6B, the order of the blocks may be modified in other implementations. In addition, non-dependent blocks may represent acts that can be performed in parallel to other blocks.

No element, act, or instruction used in the present application should be construed as critical or essential to the implementations described herein unless explicitly described as such. Also, as used herein, the article "a" is intended to include one or more items. Further, the phrase "based on" is intended to mean "based, at least in part, on" unless explicitly stated otherwise.

What is claimed is:

1. An electrical box comprising:
a top side and a bottom side that are connected to one another by panels, each of the top side and bottom side including:
a front portion with a side edge, a front edge and a back edge;
a back portion with a side edge, a front edge and a back edge; and
an angled portion connecting the front portion to the back portion, the back portion being offset with respect to the front portion, the angled portion including:
a transition edge, of the angled portion, that joins the back edge of the front portion to the back edge of the back portion,
wherein when mounting the electrical box on a wall stud inside a wall assembly, the back portions of the top and bottom sides are inserted through a hole in a drywall of the wall assembly and passed between an edge of the wall stud and an edge of the drywall and when the electrical box is rotated about the edge of the drywall of the wall assembly to position one of the back edges of the electrical box to the wall stud, the transition edges of the angled portions of the top side and the bottom side provide for clearance over the rotation of the electrical box unobstructed by the edge of the wall stud.

2. The electrical box of claim 1, wherein the transition edge includes one of:
   one or more slanted edges; or
   a rounded edge.

3. The electrical box of claim 1, wherein the angled portion includes:
   a curved portion formed between the front edge of the front portion and the front edge of the back portion, wherein the curved portion provides for additional space for maneuvering the electrical box, aligned to the wall stud in the wall assembly, out of the wall assembly through the hole in the drywall of the wall assembly.

4. The electrical box of claim 1, wherein the top side includes:
   a cover fastening portion that is integrally and perpendicularly connected to the front edge of the front portion, the cover fastening portion including a threaded hole via which a screw fastens a face plate that covers the electrical box after an installation of the electrical box in the wall assembly.

5. The electrical box of claim 1, wherein the top side includes one of:
   a grounding hole for inserting a grounding screw; or
   a grounding ear.

6. The electrical box of claim 1, wherein one of the panels includes a fastening portion that is integrally and perpendicularly connected to a front edge of the panel.

7. The electrical box of claim 1, wherein the top side, the bottom side, and the panels are attached to one another via at least one of: welds or screws.

8. The electrical box of claim 1, wherein each of the top side and bottom side includes:
   a step between the back edge of the front portion and the transition edge of the angled portion connecting the front portion to the back portion,
   wherein the steps of the top and bottom sides fit over an edge of the wall stud when the electrical box is positioned for reinstallation inside the wall assembly.

9. The electrical box of claim 1, wherein the panels include a mounting panel that connects the back edge of the front portion of the top side to the back edge of the front portion of the bottom side, the mounting panel including at least one hole for passing a first screw for affixing the electrical box to the wall stud during an installation of the electrical box in the wall assembly.

10. The electrical box of claim 9, wherein the at least one hole includes a hole that permits the first screw to pass through and be inserted into the wall stud at an orientation that is perpendicular to the mounting panel.

11. The electrical box of claim 9, wherein the panels include a back side that connects the side edge of the back portion of the top side to the side edge of the back portion of the bottom side, the back side including knock-out portions, when removed, creates knock-out holes to receive cables, connectors, or conduits into the electrical box.

12. The electrical box of claim 11, further comprising:
   a clamp for fastening the cables to one of the panels; and
   a second screw for tightening the clamp, a head of the second screw passing through a hole in another one of the panels into a portion of the clamp.

13. The electrical box of claim 12, wherein the wall assembly includes a vapor barrier, and the other one of the panels includes a recessed area that includes the hole, the recessed area partially covering the head of the second screw and preventing the second screw from puncturing the vapor barrier during the installation of the electrical box in the wall assembly.

14. The electrical box of claim 11, wherein each of the knock-out portions has a hole, the hole being open for inserting a rigid member to pry out the knock-out portion from the electrical box.

15. A method comprising:
   inserting a back portion of an electrical box at an angle through a hole in a drywall of a wall assembly and passing the back portion of the electrical box between an edge of a wall stud in the wall assembly and an edge of the drywall, wherein the electrical box includes;
   a front portion,
   the back portion offset with respect to the front portion, and
   angled portion connecting the front portion to the back portion, wherein the front portion, the back portion, and angled portion include a top wall, bottom wall, and panels that are joined to form the electrical box;
   partly rotating the electrical box to position a back side of the front portion of the electrical box to the wall stud, an angled panel on the angled portion of the electrical box providing for clearance for the rotation of the electrical box unobstructed by the edge of the wall stud; and
   fitting a step on the back of the electrical box to an edge of the wall stud.

16. The method of claim 15, further comprising:
   removing the electrical box from the wall assembly by:
   rotating the electrical box, in a direction opposite to that for rotating the electrical box to position the back side of the front portion of the electrical box to the wall stud, wherein the angled portion provides for clearance for moving the electrical box unobstructed by the edge of the wall stud;
   pulling out the front portion of the electrical box at an angle through the hole in the drywall of the wall assembly, and
   passing the back portion of the electrical box between the edge of the wall in the wall assembly and the edge of the drywall.

17. The method of claim 15, further comprising:
   covering a face of the front portion, which is exposed through the hole to space outside of the wall assembly, with a face plate; and
   attaching the face plate to the electrical box.

18. The method of claim 15, further comprising:
   inserting a screw through one of the panels of the electrical box into the wall stud; and
   fastening the electrical box to the wall assembly by tightening the screw.

19. The method of claim 15, further comprising:
   inserting a cable into the electrical box through a knock-out hole and tightening a clamp in the electrical box to affix the cable to a surface inside the electrical box.

* * * * *